(12) United States Patent
Nakamura et al.

(10) Patent No.: US 9,445,374 B2
(45) Date of Patent: Sep. 13, 2016

(54) CONTROL OF BASE STATION PARAMETERS BASED ON MAPPING OF TERMINAL DISTRIBUTION

(71) Applicant: KABUSHIKI KAISHA TOSHIBA, Minato-ku (JP)

(72) Inventors: Kohta Nakamura, Fuchu (JP); Keiji Yamamoto, Ome (JP); Taichi Tashiro, Fuchu (JP); Kenichi Ohno, Zama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 179 days.

(21) Appl. No.: 14/169,465

(22) Filed: Jan. 31, 2014

(65) Prior Publication Data

US 2014/0274194 A1  Sep. 18, 2014

(30) Foreign Application Priority Data

Mar. 14, 2013  (JP) .................. 2013-051570

(51) Int. Cl.
*H04W 16/04* (2009.01)
*H04W 24/02* (2009.01)
*H04W 28/00* (2009.01)
*H04W 52/24* (2009.01)
*H04W 52/14* (2009.01)
*H04W 52/22* (2009.01)
*H04W 72/04* (2009.01)
*H04W 16/22* (2009.01)
*H04W 52/28* (2009.01)
*H04W 28/18* (2009.01)
*H04W 4/02* (2009.01)
*H04W 4/08* (2009.01)

(52) U.S. Cl.
CPC .......... *H04W 52/241* (2013.01); *H04W 16/22* (2013.01); *H04W 52/143* (2013.01); *H04W 52/225* (2013.01); *H04W 52/228* (2013.01); *H04W 52/245* (2013.01); *H04W 72/0453* (2013.01); *H04W 4/023* (2013.01); *H04W 4/08* (2013.01); *H04W 28/18* (2013.01); *H04W 52/283* (2013.01)

(58) Field of Classification Search
None
See application file for complete search history.

(56) References Cited

U.S. PATENT DOCUMENTS

| 7,701,900 | B2 * | 4/2010 | Barnum ................. 455/62 X |
| 8,862,138 | B2 * | 10/2014 | Uusitalo et al. ............ 455/446 |
| 8,909,242 | B2 * | 12/2014 | Wu et al. ................. 455/446 X |
| 2009/0201860 | A1 * | 8/2009 | Sherman et al. ............ 370/329 |

FOREIGN PATENT DOCUMENTS

JP  2004-274313  9/2004

OTHER PUBLICATIONS

U.S. Appl. No. 14/164,381, filed Jan. 27, 2014, Kohta Nakamura, et al.

* cited by examiner

*Primary Examiner* — Philip Sobutka
(74) *Attorney, Agent, or Firm* — Oblon, McClelland, Maier & Neustadt, L.L.P.

(57) ABSTRACT

According to one embodiment, a control apparatus includes a terminal information collection unit, a map generator, a terminal information accumulation unit, a parameter calculator, and a parameter setting unit. A map generator generates a map indicating a distribution of the representative terminals. A terminal information accumulation unit accumulates the map generated by the map generator. A parameter calculator sets operating frequencies and transmission powers for the base stations by simulation, empirically estimate, based on past maps accumulated in the terminal information accumulation unit, received powers of the representative terminals generated by the operating frequencies and transmission powers sets by simulation, and determine new operating frequencies.

8 Claims, 13 Drawing Sheets

| Physical cell ID | Received power |
|---|---|
| 100 | -70dBm |
| 107 | -75dBm |

FIG. 6

| Representative terminal | Base station1 | | Base station2 | | Base station3 | | Number of communication terminals in group |
| --- | --- | --- | --- | --- | --- | --- | --- |
| | Operating frequency/ transmission power | Received power | Operating frequency/ transmission power | Received power | Operating frequency/ transmission power | Received power | |
| 1 | F1/100mW | -72dBm | F1/100mW | -82dBm | F1/100mW | -74dBm | 5 |
| 2 | F1/100mW | -80dBm | F1/100mW | -76dBm | F1/100mW | -73dBm | 2 |
| ... | | | | | | | |
| 100 | F1/100mW | -75dBm | F1/100mW | -80dBm | F1/100mW | -70dBm | 3 |

F I G. 8

| Pattern | Representative terminal | Base station1 | | Base station2 | | Base station3 | | Number of communication terminals in group | SINR value | Lowest SINR value | Average SINR value | Highest SINR value |
|---|---|---|---|---|---|---|---|---|---|---|---|---|
| | | Operating frequency/transmission power | Received power | Operating frequency/transmission power | Received power | Operating frequency/transmission power | Received power | | | | | |
| 1 | 1 | F1/100mW | -72dBm | F1/100mW | -82dBm | F1/100mW | -74dBm | 5 | 1dBm | | | |
| | 2 | F1/100mW | -80dBm | F1/100mW | -76dBm | F1/100mW | -73dBm | 2 | 2dBm | 1dBm | 19dBm | 37dBm |
| | ... | | | | | | | | | | | |
| | 100 | F1/100mW | -75dBm | F1/100mW | -80dBm | F1/100mW | -70dBm | 3 | 4dBm | | | |
| 2 | 1 | F1/100mW | -72dBm | F1/100mW | -82dBm | F1/50mW | -77dBm | 2 | 4dBm | | | |
| | 2 | F1/100mW | -80dBm | F1/100mW | -76dBm | F1/50mW | -76dBm | 4 | -1dBm | -1dBm | 17dBm | 35dBm |
| | ... | | | | | | | | | | | |
| | 100 | F1/100mW | -75dBm | F1/100mW | -80dBm | F1/50mW | -76dBm | 1 | 1dBm | | | |
| ... | | | | | | | | | | | | |
| 729 | 1 | F3/10mW | -82dBm | F3/10mW | -92dBm | F3/10mW | -84dBm | 2 | 1dBm | | | |
| | 2 | F3/10mW | -90dBm | F3/10mW | -86dBm | F3/10mW | -83dBm | 2 | 1dBm | 1dBm | 16dBm | 31dBm |
| | ... | | | | | | | | | | | |
| | 100 | F3/10mW | -85dBm | F3/10mW | -90dBm | F3/10mW | -80dBm | 1 | 4dBm | | | |

FIG. 9

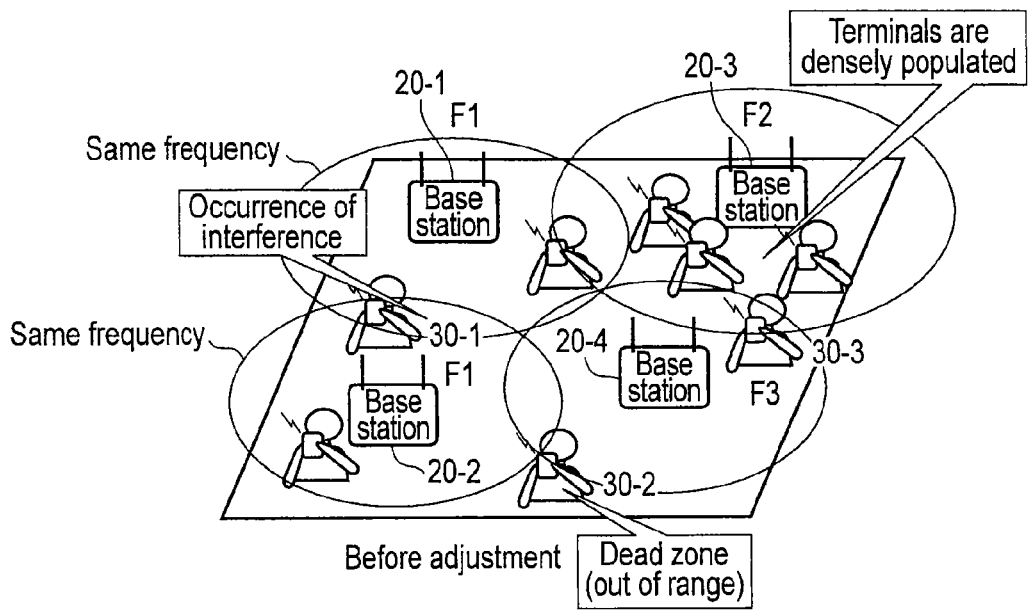
F I G. 10
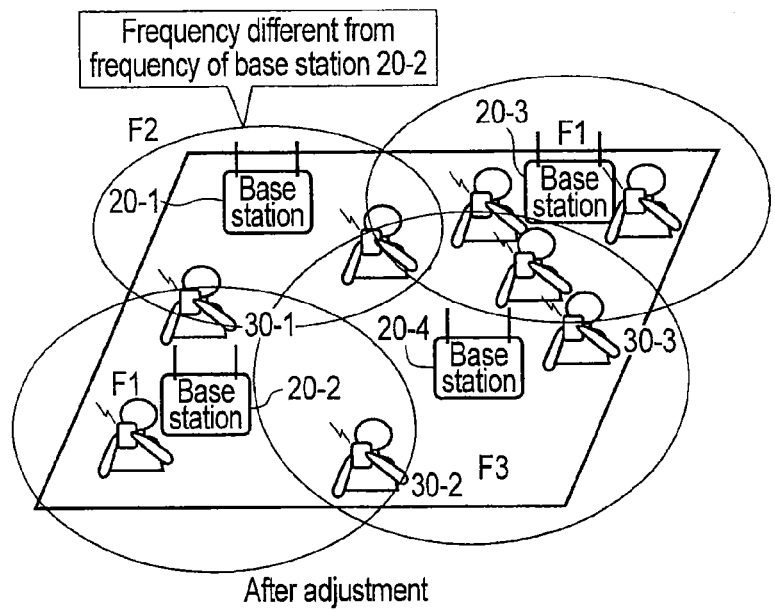
F I G. 11

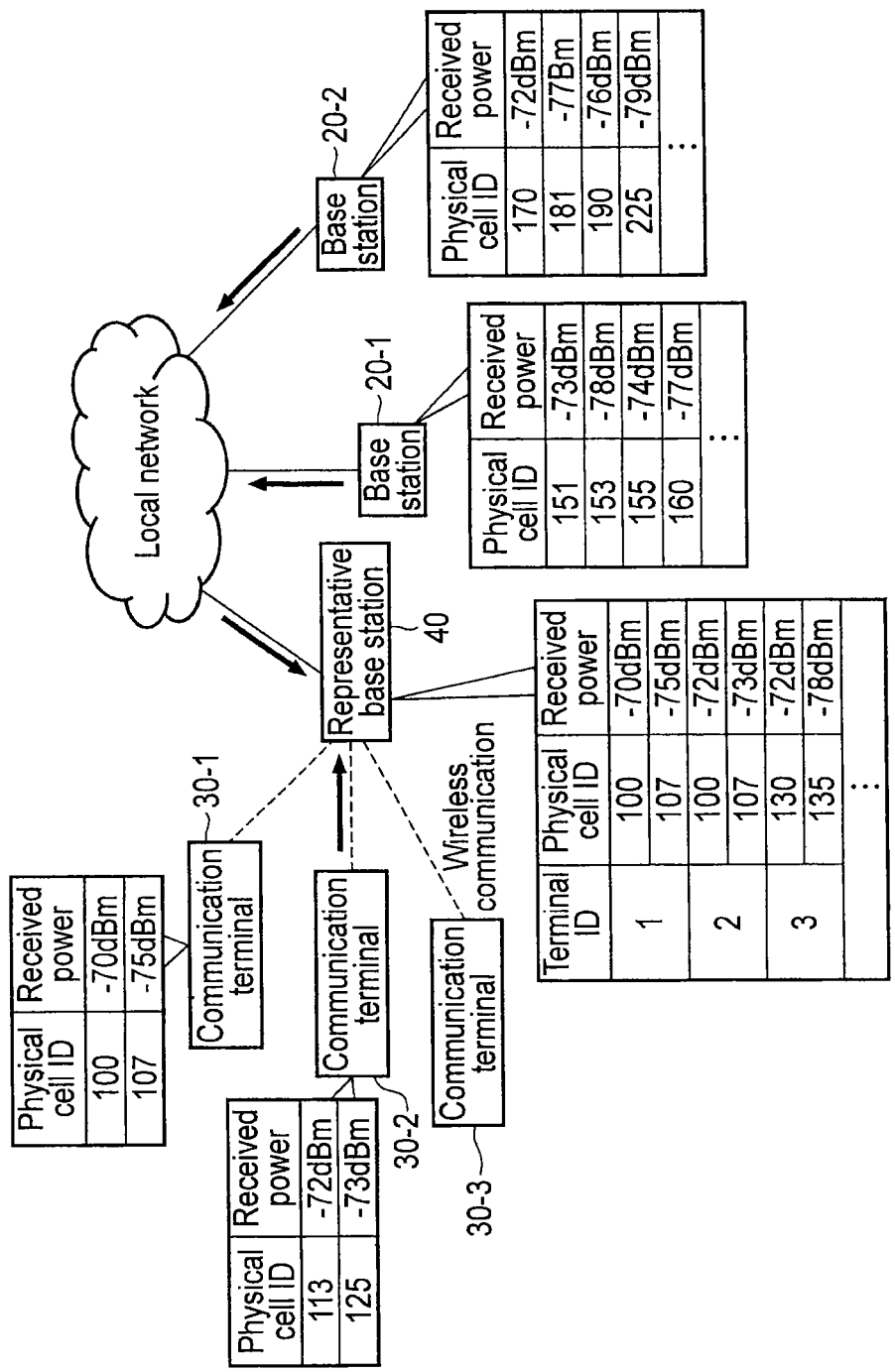
F I G. 16

CONTROL OF BASE STATION PARAMETERS BASED ON MAPPING OF TERMINAL DISTRIBUTION

CROSS-REFERENCE TO RELATED APPLICATIONS

This application is based upon and claims the benefit of priority from the prior Japanese Patent Applications No. 2013-051570, filed Mar. 14, 2013, the entire which are incorporated herein by reference.

FIELD

Embodiments described herein relate to a control apparatus and a representative base station which are used in a wireless communication system for wirelessly communicating with a communication terminal using a local network, and a base station control method used in the wireless communication system.

BACKGROUND

Mobile traffic is increasing year by year, and it is thus desired to increase the speed of mobile communication. Meanwhile, each telecommunications carrier has started an LTE (Long Term Evolution) service for high-speed wireless communication. On the other hand, indoor mobile traffic is also increasing year by year. Along with an increase in mobile data traffic, it is required to improve the wireless quality of indoor traffic.

To increase an indoor traffic capacity, it is necessary to arrange a number of base stations called femtocells each having a radio radius of about several tens of meters in a close range. When base stations of the same operating frequency are adjacent to each other, interference occurs, thereby decreasing the throughput. To improve the wireless quality of indoor traffic, it is necessary to eliminate an indoor dead zone by adjusting the transmission powers of the femtocells, and suppress interference by assigning operating frequencies to the femtocells so that the coverage areas of the femtocells of the same operating frequency do not overlap each other, thereby improving the throughput.

Conventionally, there has been adopted a method of generating a radio wave environment map for recognizing an indoor radio wave environment using a measurement terminal, and setting optimal parameters for each base station based on the map. In the method, however, when the radio wave environment changes, it is impossible to maintain the optimal radio wave environment. For example, in the method, every time the indoor operation environment changes after the start of the operation of base stations (for example, an indoor base station is newly added, an indoor base station fails, and an indoor layout changes due to movement of a wall), an examiner needs to measure the radio wave environment again using the measurement terminal, thereby decreasing the throughput.

BRIEF DESCRIPTION OF THE DRAWINGS

FIG. 6 is a table schematically showing an example of a correspondence table transmitted from the communication terminal to the base station, both shown in FIG. 1;

FIG. 8 is a table showing a radio wave environment map generated by a map generator of the control apparatus shown in FIG. 1;

FIG. 9 is a table schematically showing the received power and SINR of each representative terminal when base station parameters change, which are calculated by a parameter calculator of the control apparatus shown in FIG. 3;

FIG. 10 is a schematic view showing an example of a state before the control apparatus shown in FIG. 1 adjusts base stations;

FIG. 11 is a schematic view showing an example of a state after the control apparatus shown in FIG. 1 adjusts the base stations;

FIG. 16 is a schematic view showing an example of correspondence tables in the communication terminals, representative base station, and base stations which are shown in FIG. 13.

DETAILED DESCRIPTION

In general, according to one embodiment, a control apparatus includes a terminal information collection unit, a map generator, a terminal information accumulation unit, a parameter calculator, and a parameter setting unit. A map generator generates a map indicating a distribution of the representative terminals. A terminal information accumulation unit accumulates the map generated by the map generator. A parameter calculator sets operating frequencies and transmission powers for the base stations by simulation, empirically estimate, based on past maps accumulated in the terminal information accumulation unit, received powers of the representative terminals generated by the operating frequencies and transmission powers sets by simulation, and determine new operating frequencies.

Embodiments will be described below with reference to the accompanying drawings.

(First embodiment)

Figure 1:
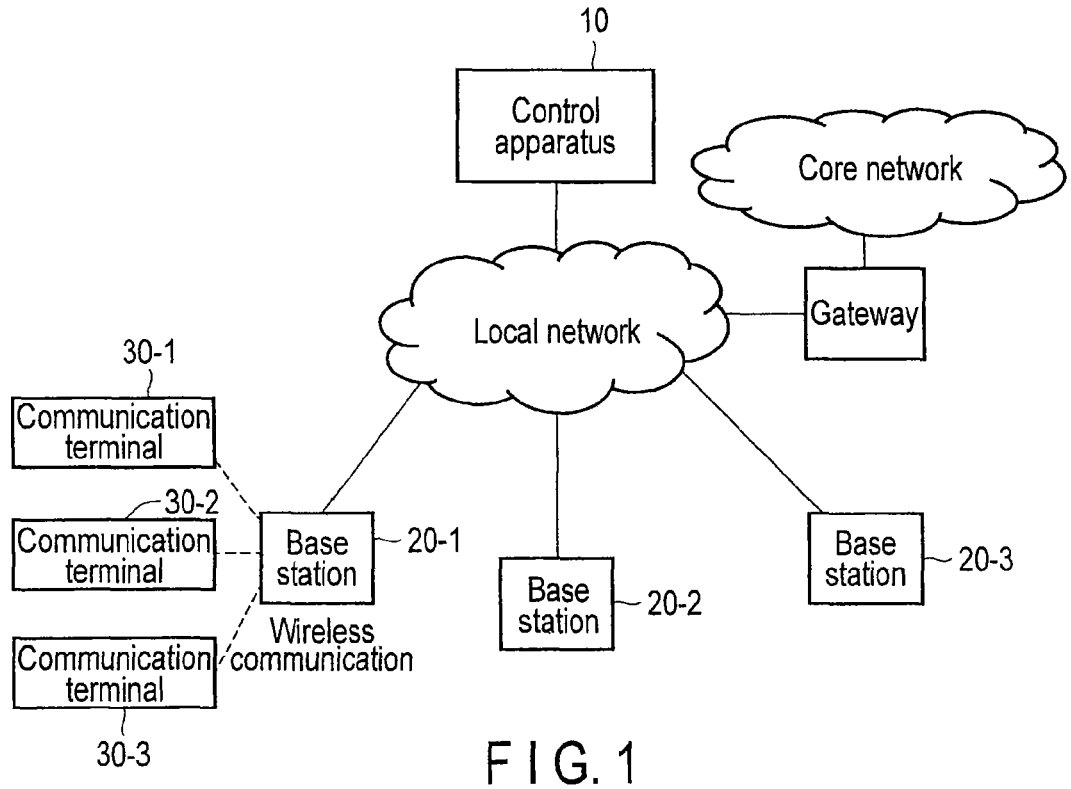
FIG. 1 is a block diagram showing the arrangement of a wireless communication system according to the first embodiment.

FIG. 1 is a block diagram showing the functional arrangement of a wireless communication system according to the first embodiment.

The wireless communication system shown in FIG. 1 includes a control apparatus 10 and base stations 20-1 to 20-3. The control apparatus 10 and base stations 20-1 to 20-3 are connected to each other via a local network. Referring to FIG. 1, the base station 20-1 accommodates communication terminals 30-1 to 30-3 for wirelessly communicating with it. Although not shown in FIG. 1, each of the base stations 20-2 and 20-3 accommodates communication terminals for wirelessly communicating with it. The local network is connected to a core network (carrier network) via a gateway.

Figure 2:
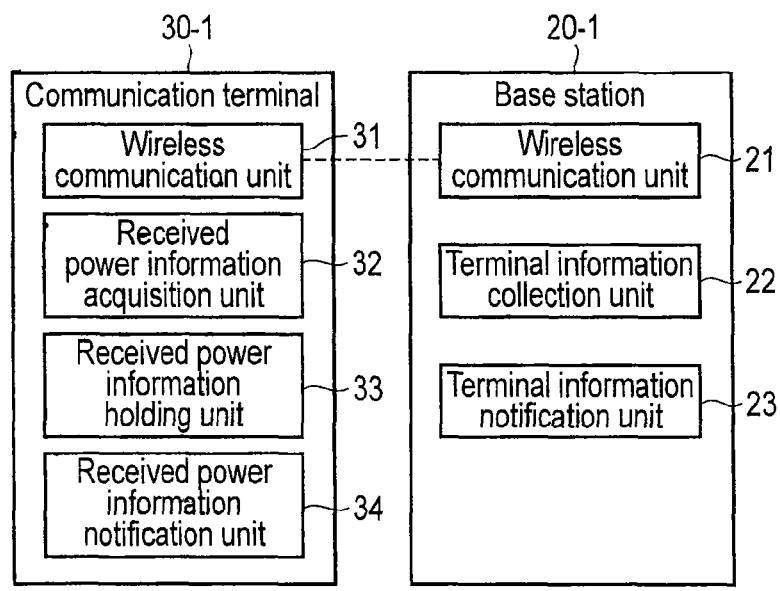
FIG. 2 is a block diagram showing the functional arrangement of a base station and communication terminal, both shown in FIG. 1.

FIG. 2 is a block diagram showing the functional arrangement of the base station 20-1 and communication terminal 30-1, both shown in FIG. 1. Note that although FIG. 2 exemplifies the functional arrangement of the communication terminal 30-1 and base station 20-1, the arrangement of the communication terminal 30-2 or 30-3 and the base station 20-2 or 20-3 is also the same as that shown in FIG. 2.

The communication terminal 30-1 shown in FIG. 2 includes a wireless communication unit 31, a received power information acquisition unit 32, a received power information holding unit 33, and a received power information notification unit 34.

The wireless communication unit 31 wirelessly communicates with, for example, the base station 20-1 having a highest received power of a signal to be transmitted among the base stations 20-1 to 20-3 according to an LTE protocol.

The received power information acquisition unit 32 acquires the received power of a signal transmitted by each of the base stations 20-1 to 20-3, a physical cell ID for specifying the base station which has transmitted the signal, a throughput, an error rate in communication, and sensor information such as Global Positioning System(GPS) information for specifying the position of the communication terminal at preset intervals. Note that it is possible to acquire the received power and physical cell ID in the LTE standard specification.

The received power information holding unit 33 forms and holds a correspondence table between the acquired received power and physical cell ID. The received power information holding unit 33 updates the held correspondence table every time the received power information acquisition unit 32 acquires a new received power and physical cell ID.

In response to a request from the connected base station 20-1, the received power information notification unit 34 transmits the held correspondence table and sensor information to the base station 20-1 as terminal information. At this time, the received power information notification unit 34 transmits the terminal information added with the identifier of the self-terminal to the base station 20-1. Note that the received power information notification unit 34 may actively transmit the terminal information to the base station 20-1 at a preset timing.

The base station 20-1 shown in FIG. 2 includes a wireless communication unit 21, a terminal information collection unit 22, and a terminal information notification unit 23.

The wireless communication unit 21 wirelessly communicates with the communication terminals 30-1 to 30-3.

The terminal information collection unit 22 receives terminal information transmitted by each of the communication terminals 30-1 to 30-3, and collects the received terminal information together with the identifier. When requesting terminal information of the communication terminals 30-1 to 30-3, the terminal information collection unit 22 may request terminal information of all the communication terminals 30-1 to 30-3, or request terminal information of only communication terminals not in an idle state but in a connected state. Note that the idle state indicates a state in which communication between the base station and the communication terminal has not been performed for a predetermined period of time and thus the communication terminal has deactivated its communication function.

The terminal information notification unit 23 transmits the collected terminal information to the control apparatus 10. Note that the terminal information notification unit 23 may transmit the terminal information to the control apparatus 10 at a preset timing.

Figure 3:
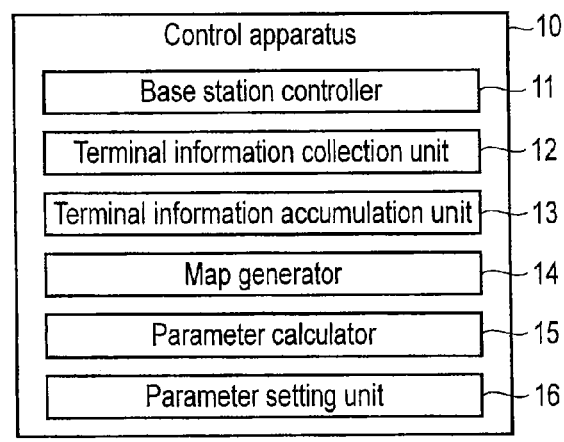
FIG. 3 is a block diagram showing the functional arrangement of a control apparatus shown in FIG. 1.

FIG. 3 is a block diagram showing the functional arrangement of the control apparatus 10 shown in FIG. 1.

The control apparatus 10 includes, for example, a Central Processing Unit(CPU), and areas such as a Read Only Memory(ROM) and Random Access Memory(RAM) for storing programs and data to be used by the CPU to execute processing. The control apparatus 10 includes a base station controller 11, terminal information collection unit 12, terminal information accumulation unit 13, map generator 14, parameter calculator 15, and parameter setting unit 16, which are shown in FIG. 3, by causing the CPU to execute programs.

The base station controller 11 controls the operation of each of the base stations 20-1 to 20-3.

The terminal information collection unit 12 collects terminal information transmitted by each of the base stations 20-1 to 20-3. The terminal information collection unit 12 transmits the collected terminal information to the map generator 14. Note that the terminal information collection unit 12 may receive terminal information from each of the base stations 20-1 to 20-3 at regular intervals, or receive terminal information by sending a terminal information acquisition request to each of the base stations 20-1 to 20-3.

The terminal information accumulation unit 13 accumulates a radio wave environment map generated by the map generator 14. Note that the radio wave environment map will be described in conjunction with the map generator 14.

In response to a request from the map generator 14, the terminal information accumulation unit 13 searches accumulated past radio wave environment maps for a radio wave environment map with the distribution of representative terminals similar to that of the radio wave environment map generated by the map generator 14. The terminal information accumulation unit 13 transmits the radio wave environment map obtained by the search processing to the map generator 14. Note that the representative terminals will be described in conjunction with the map generator 14, similarly to the above radio wave environment map.

Furthermore, the terminal information accumulation unit 13 sets priority levels for the accumulated radio wave environment maps so that a radio wave environment map having a higher use frequency has a higher priority level. For example, the terminal information accumulation unit 13 accumulates, for each radio wave environment map, as an index for recognizing a use frequency, the number of times the radio wave environment map is transmitted to the map generator 14, and then sets a higher priority level for a radio wave environment map transmitted a larger number of times.

The map generator 14 extracts a representative terminal by grouping together communication terminals which have been determined to be close to each other. Note that "close" means that the distance between communication terminals is shorter than a predetermined one. The representative terminal includes terminal information collected when grouping the communication terminals. As a clustering method, well-known hierarchical clustering such as a group average method, single linkage method, or complete linkage method, or well-known non-hierarchical clustering such as a K-means method or EM (Expectation Maximization) algorithm may be used. When, for example, hierarchical clustering is adopted, the map generator 14 determines that communication terminals having similar terminal information are close to each other. The map generator 14 generates a radio wave environment map indicating the distribution of the representative terminals in an indoor area. The map generator 14 transmits the generated radio wave environment map to the terminal information accumulation unit 13.

If an area where no representative terminal is extracted since no communication terminal is present and thus it is impossible to extract any terminal information, the map generator 14 complements a representative terminal in the area where no representative terminal is extracted. At this time, the map generator 14 sends a radio wave environment map search request to the terminal information accumulation unit 13. The map generator 14 acquires one of the radio wave environment maps accumulated in the terminal information accumulation unit 13, which has a distribution of representative terminals similar to that of the generated radio wave environment map. The map generator 14 complements, by the acquired radio wave environment map, a representative terminal in the area where no representative terminal is extracted, and generates a complementary radio wave environment map including the complemented representative terminal. The map generator 14 transmits the generated complementary radio wave environment map to the parameter calculator 15.

Figure 4:
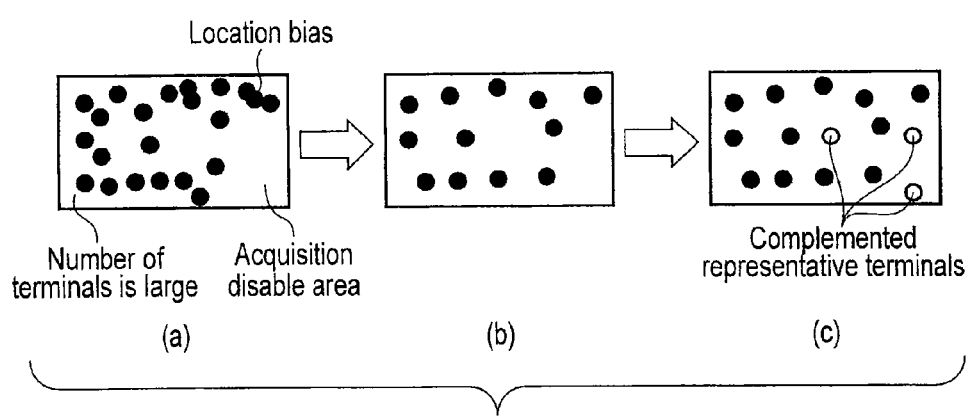
FIG. 4 is a view showing a procedure of generating a complementary radio wave environment map from terminal information collected in the control apparatus shown in FIG. 1.

FIG. 4 is a view showing a procedure of generating a complementary radio wave environment map from terminal information collected in the control apparatus 10 shown in FIG. 1. Since there are many communication terminals as shown in (a) of FIG. 4, the map generator 14 clusters them to extract representative terminals as shown in (b) of FIG. 4. Furthermore, as shown in (c) of FIG. 4, the map generator 14 acquires a radio wave environment map from the terminal information accumulation unit 13, and complements, by the acquired radio wave environment map, a representative terminal in an area where it is impossible to extract any representative terminal.

Note that the map generator 14 may specify the position of each communication terminal based on sensor information such as GPS information transmitted from the communication terminal via the base station. At this time, the map generator 14 determines based on the pieces of position information of the communication terminals whether they are close to each other, and extracts a representative terminal by grouping together communication terminals which have been determined to be close to each other.

Based on the complementary radio wave environment map generated by the map generator 14, the parameter calculator 15 determines a transmission power, operating frequency, physical cell ID, neighbor list, handover threshold, base station ID, frequency bandwidth, the IP address of a base station, neighboring cell information, cell size, and the like. Note that the neighbor list, neighboring cell information, and handover threshold can form a radio wave environment in combination with the transmission power and operating frequency. That is, it is possible to control handover and generate a radio wave environment on the assumption that frequency resources are reallocated to the communication terminals in operation by intentionally changing the neighbor list and neighboring cell information in operation. Furthermore, by using the changed handover threshold, it is possible to improve the throughput by changing the connection destination of a terminal.

As a practical example, a method of determining transmission powers and operating frequencies for the base stations will be described.

The parameter calculator 15 receives the complementary radio wave environment map transmitted by the map generator 14, and calculates an Signal to Interference and Noise power Ratio(SINR) for each representative terminal of the received complementary radio wave environment map based on terminal information included in the representative terminal. Furthermore, based on the calculated SINRs for the respective representative terminals, the parameter calculator 15 obtains the variance of the SINRs, a lowest SINR value, an average SINR value, and a highest SINR value.

The parameter calculator 15 sets operating frequencies and transmission powers for the base stations by simulation, and empirically estimates the received powers of the representative terminals for the operating frequencies and transmission powers set by simulation, based on the past maps accumulated in the terminal information accumulation unit 13. The parameter calculator 15 determines new operating frequencies and transmission powers for the base stations based on the estimation result.

For example, the parameter calculator 15 sets base station parameters for the base stations 20-1 to 20-3 by simulation. The parameter calculator 15 reads out a change trend of the received power of each representative terminal along with a change in base station parameters from the terminal information accumulation unit 13. It is possible to recognize the trend by referring to the radio wave environment maps accumulated in the terminal information accumulation unit 13. Based on the readout trend, the parameter calculator 15 calculates the received power of the representative terminal for the base station parameters set by simulation. The parameter calculator 15 calculates an SINR based on the calculated received power. Based on the calculated SINRs, the parameter calculator 15 obtains the variance of the SINRs, a lowest SINR value, an average SINR value, and a highest SINR value.

The parameter calculator 15 determines new base station parameters for the base stations 20-1 to 20-3 among the base station parameters set by simulation by referring to the obtained variance of the SINRs, lowest SINR value, average SINR value, and highest SINR value. For example, among the base station parameters set by simulation, the parameter calculator 15 determines, as new base station parameters, base station parameters with which the lowest SINR value is equal to or higher than a predetermined value (for example, 4 dB), the highest SINR value is equal to or lower than a predetermined value (for example, 37 dB), the variance of the SINRs of the respective representative terminals falls within a predetermined range, and the average SINR value is highest.

The parameter calculator 15 transmits the physical cell ID of a corresponding base station and the determined base station parameters to the parameter setting unit 16.

The parameter setting unit 16 sets the determined base station parameters in each base station specified by the physical cell ID transmitted by the parameter calculator 15.

Figure 5:
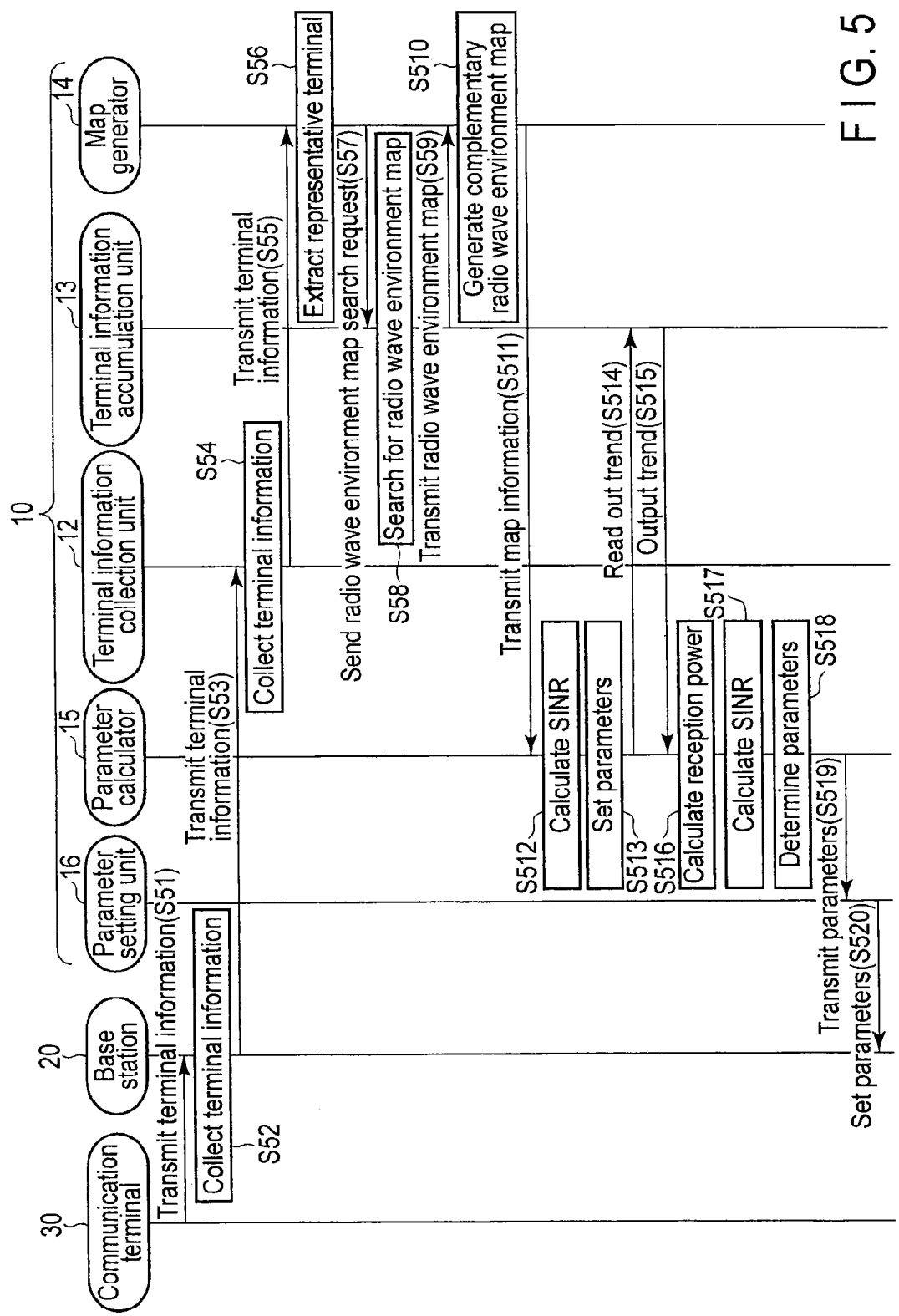
FIG. 5 is a sequence chart when the wireless communication system shown in FIG. 1 sets base station parameters.

An operation in which the wireless communication system with the above arrangement sets the parameters of the base stations 20-1 to 20-3 will now be described in detail. FIG. 5 is a sequence chart when the wireless communication system according to the embodiment sets the parameters of the base stations 20-1 to 20-3.

Each of the communication terminals 30-1 to 30-3 transmits, to the base station 20-1, the held correspondence table between the received power and the physical cell ID as terminal information together with an identifier for identifying the self-terminal (sequence S51). FIG. 6 is a table schematically showing an example of the correspondence table transmitted from the communication terminal to the base station, both shown in FIG. 1.

The base station 20-1 receives the terminal information transmitted by each of the communication terminals 30-1 to 30-3, and collects the received terminal information (sequence S52). Each of the base stations 20-1 to 20-3 transmits the collected terminal information to the control apparatus 10 (sequence S53).

Figure 7:
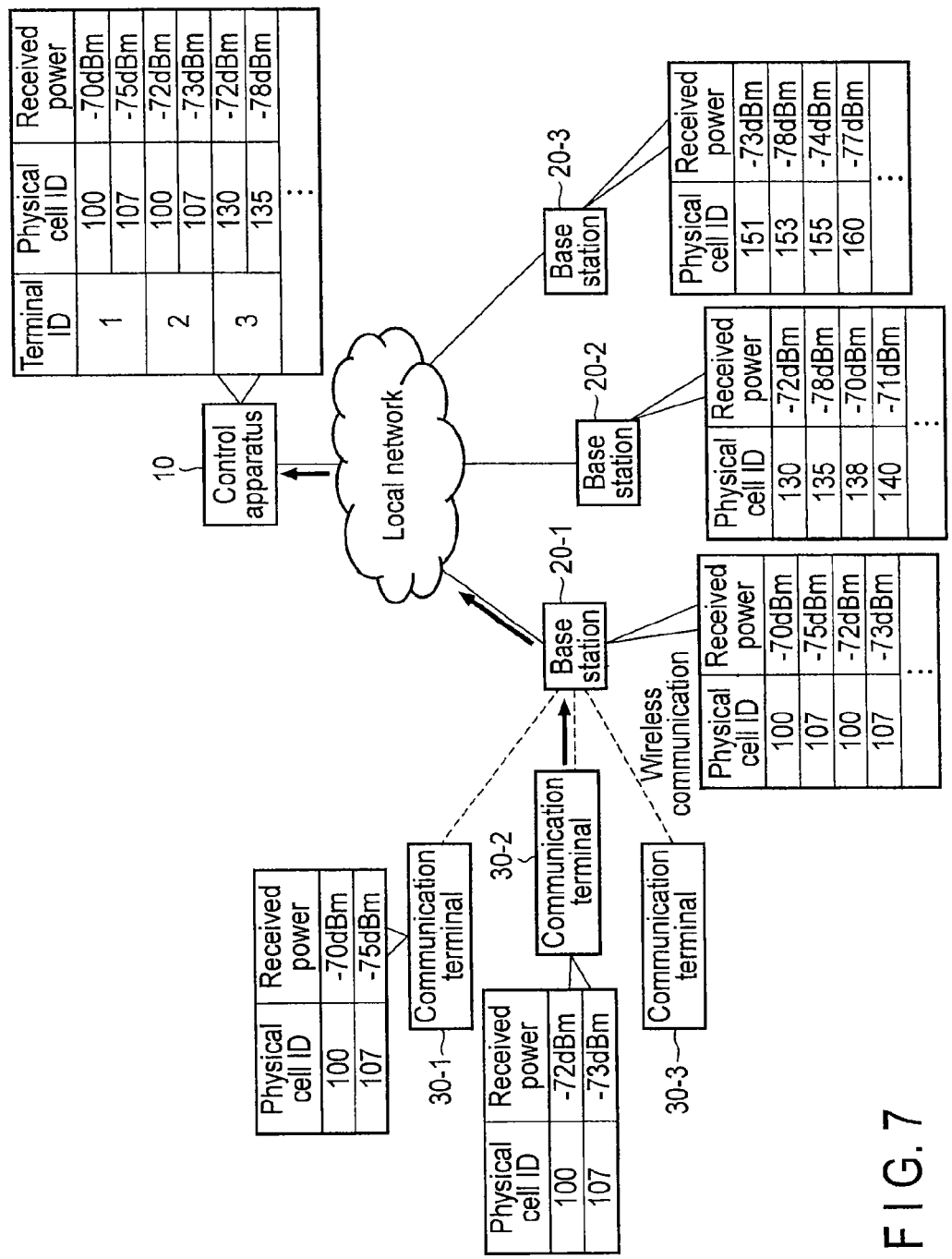
FIG. 7 is a schematic view showing an example of correspondence tables in the communication terminals, base stations, and control apparatus which are shown in FIG. 1.

The terminal information collection unit 12 of the control apparatus 10 receives the terminal information transmitted by each of the base stations 20-1 to 20-3 via the local network, and collects the received terminal information (sequence S54). FIG. 7 is a schematic view showing an example of the corresponding tables in the communication terminals, base stations, and control apparatus, which are shown in FIG. 1. The terminal information collection unit 12 transmits the collected terminal information to the map generator 14 (sequence S55).

The map generator 14 extracts a representative terminal by grouping together communication terminals which have been determined to be close to each other (sequence S56). The map generator 14 generates a radio wave environment map indicating the distribution of the representative terminals in an indoor area. FIG. 8 is a table showing the radio wave environment map generated by the map generator 14.

Furthermore, the map generator 14 sends a radio wave environment map search request to the terminal information accumulation unit 13 to complement a representative terminal in an area where it is impossible to extract any representative terminal (sequence S57).

In response to the request from the map generator 14, the terminal information accumulation unit 13 searches for a radio wave environment map similar to that generated in sequence S56 (sequence S58). The terminal information accumulation unit 13 transmits the radio wave environment map similar to that generated in sequence S56 to the map generator 14 (sequence S59).

The map generator 14 complements, by the radio wave environment map transmitted by the terminal information accumulation unit 13, a representative terminal in an area where it is impossible to extract any representative terminal, thereby generating a complementary radio wave environment map (sequence S510). The map generator 14 transmits the generated complementary radio wave environment map to the parameter calculator 15 (sequence S511).

The parameter calculator 15 receives the complementary radio wave environment map transmitted by the map generator 14, and calculates an SINR for each representative terminal of the received complementary radio wave environment map based on a received power and physical cell ID included in the representative terminal (sequence S512). Based on the calculated SINRs of the respective representative terminals, the parameter calculator 15 obtains the variance of the SINRs, an average SINR, a lowest SINR, and a highest SINR.

The parameter calculator 15 also sets base station parameters for the base stations 20-1 to 20-3 by simulation (sequence S513). The parameter calculator 15 reads out a change trend of the received power of each representative terminal along with a change in base station parameters from the terminal information accumulation unit 13 (sequence S514).

In response to a trend readout operation by the parameter calculator 15, the terminal information accumulation unit 13 outputs the trend to the parameter calculator 15 (sequence S515).

The parameter calculator 15 inputs the trend output from the terminal information accumulation unit 13. Based on the trend, the parameter calculator 15 calculates the received power of the representative terminal for the base station parameters set by simulation (sequence S516). The parameter calculator 15 calculates an SINR from the calculated received power (sequence S517). Based on the calculated SINRs, the parameter calculator 15 obtains the variance of the SINRs, a lowest SINR value, an average SINR value, and a highest SINR value. FIG. 9 is a table schematically showing the received power and SINR of each representative terminal when the base station parameters change, which are calculated by the parameter calculator 15. Although 729 patterns of the base station parameters set in the base stations 20-1 to 20-3 are set in FIG. 9, more patterns may be set.

Among the base station parameters set by simulation, the parameter calculator 15 determines new base station parameters for the base stations 20-1 to 20-3 by referring to the obtained variance of the SINRs, average SINR value, lowest SINR value, and highest SINR value (sequence S518). The parameter calculator 15 transmits the new base station parameters to the parameter setting unit 16 (sequence S519).

The parameter setting unit 16 sets the base station parameters transmitted by the parameter calculator 15 in the base stations 20-1 to 20-3 (sequence S520).

FIG. 10 is a schematic view showing an example of a state before the control apparatus 10 adjusts base stations 20-1 to 20-4. FIG. 11 is a schematic view showing an example of a state after the control apparatus 10 adjusts the base stations 20-1 to 20-4.

Referring to FIG. 10, since a signal of a frequency F1 transmitted by the base station 20-1 interferes with a signal of the frequency F1 transmitted by the base station 20-2, the communication terminal 30-1 cannot obtain enough throughput. Moreover, the communication terminal 30-2 does not belong to any communication areas formed by the base stations, and is thus located in a dead zone. Since the communication terminal 30-3 exists at the edge of the communication area formed by the base station 20-4, it cannot obtain enough throughput. In addition, since communication terminals are densely populated around the base station 20-3 and it is thus impossible to ensure enough slots to exchange information with the communication terminals, the communication terminals located around the base station 20-3 cannot obtain enough throughput.

On the other hand, as shown in FIG. 11, the control apparatus 10 sets the frequency of the base station 20-1 to F2 and sets the frequency of the base station 20-3 to F1. This improves the throughput of the communication terminal 30-1. The control apparatus 10 amplifies the transmission power of the base station 20-2 and that of the base station 20-4. As a result, the dead zone where the communication terminal 30-2 is located is eliminated, and the throughput of the communication terminal 30-3 improves. Furthermore, the control apparatus 10 amplifies the transmission power of the base station 20-4. This distributes the load of the base station 20-3 for the communication terminals, thereby improving the throughputs of the communication terminals located around the base station 20-3.

Figure 12:
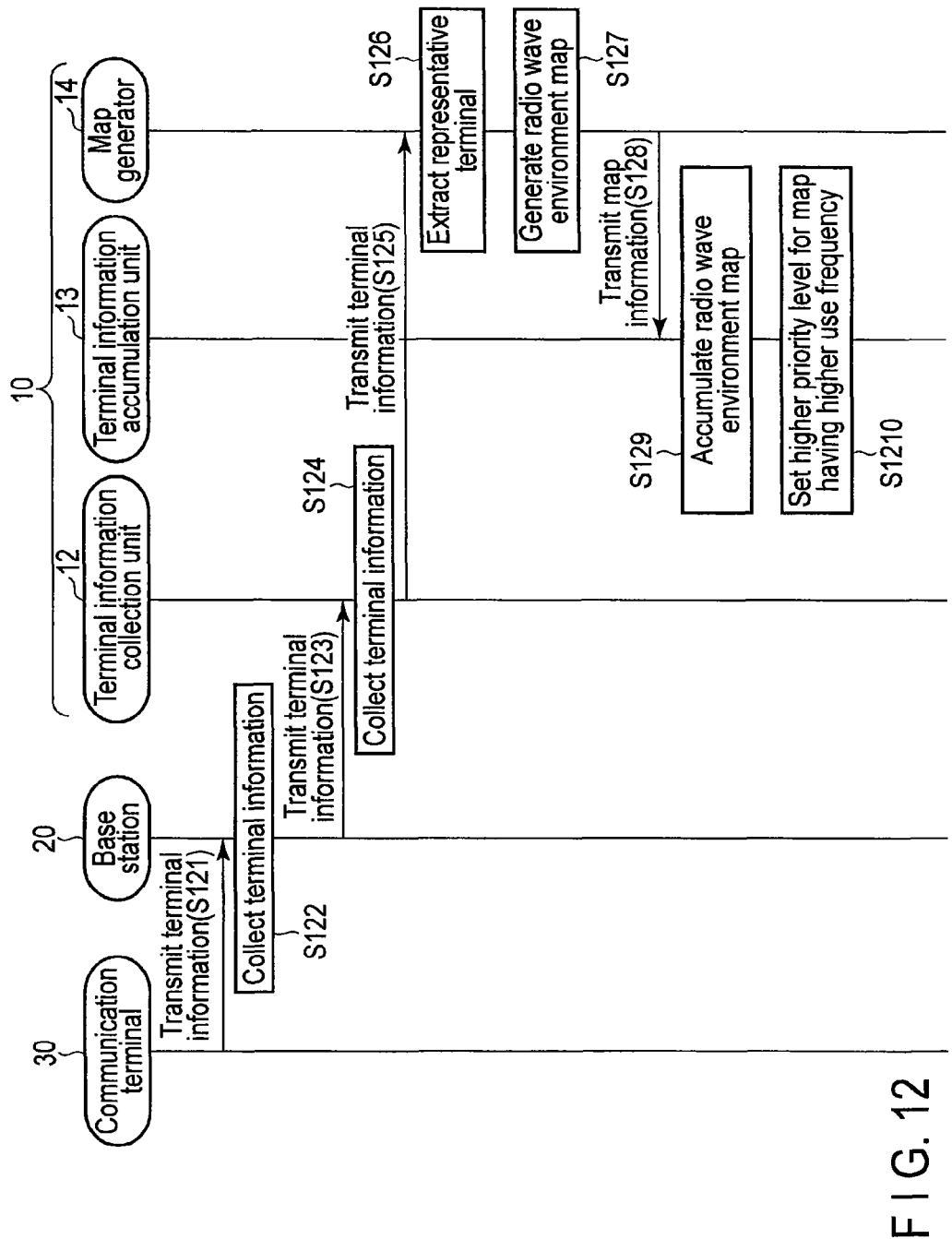
FIG. 12 is a sequence chart showing a procedure in which a terminal information accumulation unit of the control apparatus shown in FIG. 3 accumulates a radio wave environment map.

An operation in which the wireless communication system according to the first embodiment accumulates a radio wave environment map will now be described in detail. FIG. 12 is a sequence chart showing a procedure in which the terminal information accumulation unit 13 accumulates a radio wave environment map.

Each of the communication terminals 30-1 to 30-3 transmits, to the base station 20-1, the held correspondence table between the received power and the physical cell ID as terminal information together with an identifier for identifying the self-terminal (sequence S121).

The base station 20-1 receives the terminal information transmitted by each of the communication terminals 30-1 to 30-3, and collects the received terminal information (sequence S122). Each of the base stations 20-1 to 20-3 transmits the collected terminal information to the control apparatus 10 (sequence S123).

The terminal information collection unit 12 of the control apparatus 10 receives the terminal information transmitted by each of the base stations 20-1 to 20-3, and collects the received terminal information (sequence S124). The terminal information collection unit 12 transmits the collected terminal information to the map generator 14 (sequence S125).

The map generator 14 extracts a representative terminal by grouping together communication terminals which have been determined to be close to each other (sequence S126). The map generator 14 generates a radio wave environment map indicating the distribution of the representative terminals in an indoor area (sequence S127). The map generator 14 transmits the generated radio wave environment map to the terminal information accumulation unit 13 (sequence S128).

The terminal information accumulation unit 13 receives the radio wave environment map transmitted by the map generator 14, and accumulates the received radio wave environment map (sequence S129). The terminal information accumulation unit 13 also sets priority levels for the radio wave environment maps so that a radio wave environment map having a higher use frequency has a higher priority level (sequence S1210).

As described above, in the first embodiment, each of the base station 20-1 to 20-3 receives a received power and physical cell ID from each communication terminal 30 for wireless communication, and outputs the received power and physical cell ID to the control apparatus 10 via the local network. The control apparatus 10 clusters the received powers and physical cell IDs, and extracts a representative terminal by grouping together communication terminals which have been determined to be close to each other, thereby generating a radio wave environment map. The control apparatus 10 accumulates the generated radio wave environment map in the terminal information accumulation unit 13. The control apparatus 10 sets operating frequencies and transmission powers for the base stations by simulation, and empirically estimates the received powers of the representative terminals for the operating frequencies and transmission powers set by simulation, based on the past maps accumulated in the terminal information accumulation unit 13. The control apparatus 10 determines new operating frequencies and transmission powers for the base stations 20-1 to 20-3 based on the estimation result. The control apparatus 10 sets the new operating frequencies and transmission powers. This allows the wireless communication system to dynamically improve the throughput even if a change in operation environment decreases the throughput.

According to the wireless communication system of the first embodiment, therefore, it is possible to update a radio wave environment map and dynamically adjust parameters to optimal values according to a change in operation environment.

The terminal information accumulation unit 13 sets priority levels for the accumulated past radio wave environment maps so that a radio wave environment map having a higher use frequency has a higher priority level. The terminal information accumulation unit 13 preferentially searches for a map set with a higher priority level. This enables the terminal information accumulation unit 13 to shorten the time taken to search for a radio wave environment map.

Although the map generator 14 uses a past radio wave environment map similar to the generated one to complement a representative terminal in an area where no representative terminal is extracted, the present invention is not limited to this. The map generator 14 may estimate a position where a representative terminal appears by clustering, based on a past radio wave environment map similar to the generated one. This allows the map generator 14 to shorten the time taken for clustering.

Furthermore, in the first embodiment, a case in which the parameter calculator 15 determines new base station parameters for the base stations 20-1 to 20-3 by referring to the variance of SINRs, a lowest SINR value, an average SINR value, and a highest SINR value without considering the number of communication terminals in the group has been exemplified. If, however, the number of communication terminals which are grouped into a representative terminal is equal to or larger than a specified number, an SINR calculated by the parameter calculator 15 becomes small, which increases the variance of SINRs.

To solve this problem, if the number of communication terminals which are grouped into a representative terminal is equal to or larger than the specified number, the parameter calculator 15 may widen the tolerance range of the variance of SINRs by a preset range in consideration of the number of communication terminals in the group. This enables the parameter calculator 15 to include, as candidates, base station parameters excluded from candidates in the first embodiment. That is, the parameter calculator 15 can determine base station parameters more correctly because it also considers base station parameters with a large variance of SINRs.

(Second embodiment)

Figure 13:
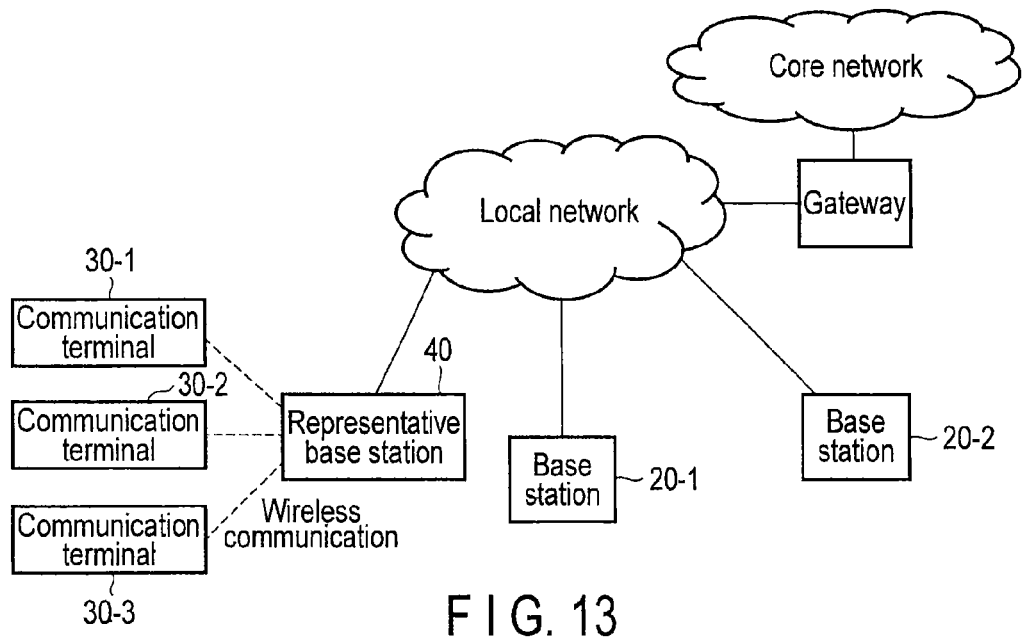
FIG. 13 is a block diagram showing the functional arrangement of a wireless communication system according to the second embodiment.

FIG. 13 is a block diagram showing the functional arrangement of a wireless communication system according to the second embodiment. The wireless communication system shown in FIG. 13 includes a representative base station 40 and base stations 20-1 and 20-2. The representative base station 40 and base stations 20-1 and 20-2 are connected to each other via a local network. Referring to FIG. 13, the representative base station 40 accommodates communication terminals 30-1 to 30-3 for wirelessly communicating with it. Although not shown in FIG. 13, each of the base stations 20-1 and 20-2 accommodates communication terminals for wirelessly communicating with it. The local network is connected to a core network (carrier network) via a gateway.

Figure 14:
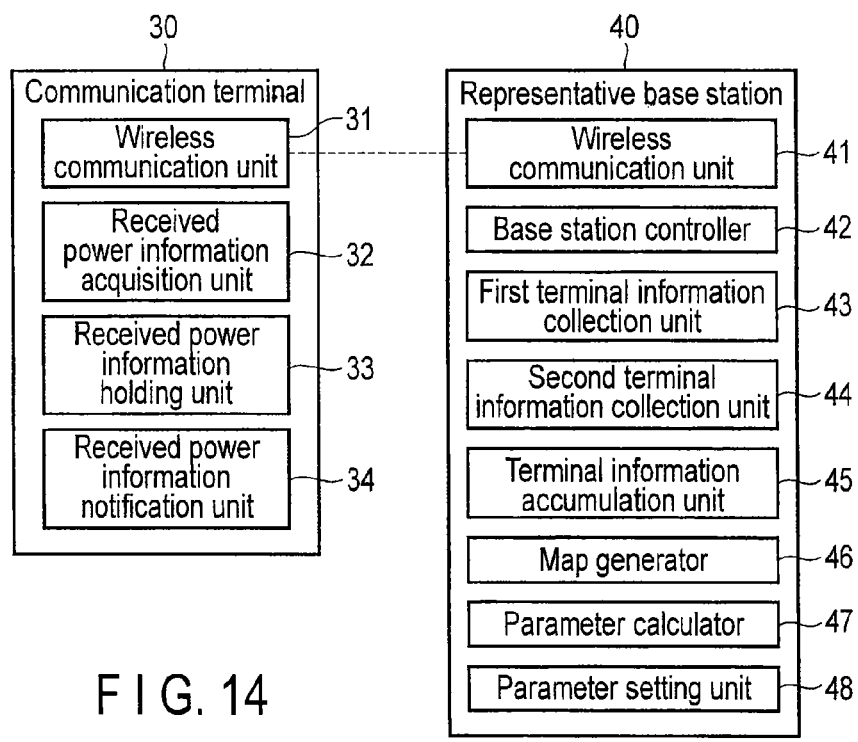
FIG. 14 is a block diagram showing the functional arrangement of a representative base station and communication terminal, both shown in FIG. 13.

FIG. 14 is a block diagram showing the functional arrangement of the representative base station 40 and communication terminal 30-1, both shown in FIG. 13. The communication terminal 30-1 shown in FIG. 14 includes a wireless communication unit 31, a received power information acquisition unit 32, a received power information holding unit 33, and a received power information notification unit 34.

The wireless communication unit 31 wirelessly communicates with the representative base station 40 according to the LTE protocol.

The received power information acquisition unit 32 acquires the received power of a signal transmitted by each of the representative base station 40 and base stations 20-1 and 20-2, a physical cell ID for specifying the base station which has transmitted the signal, a throughput, an error rate in communication, and sensor information such as Global Positioning System(GPS) information for specifying the position of the communication terminal at preset intervals. Note that it is possible to acquire the received power and physical cell ID in the LTE standard specification.

The received power information holding unit 33 generates and holds a correspondence table between the acquired received power and physical cell ID. The received power information holding unit 33 updates the held correspondence table every time the received power information acquisition unit 32 acquires a new received power and physical cell ID.

In response to a request from the connected representative base station 40, the received power information notification unit 34 transmits the held correspondence table and sensor information to the representative base station 40 as terminal information. At this time, the received power information notification unit 34 transmits the terminal information added with the identifier of the self-terminal to the representative base station 40. Note that the received power information notification unit 34 may actively transmit the terminal information to the representative base station 40 at a preset timing.

The representative base station 40 shown in FIG. 14 includes, for example, a CPU, and areas such as a ROM and RAM for storing programs and data to be used by the CPU to execute processing. The representative base station 40 includes a wireless communication unit 41, base station controller 42, first terminal information collection unit 43, second terminal information collection unit 44, terminal information accumulation unit 45, map generator 46, parameter calculator 47, and parameter setting unit 48 by causing the CPU to execute programs. Note that the functional arrangement of the base station 20-1 or 20-2 shown in FIG. 14 is the same as that of the base station 20-1 described in the first embodiment.

The wireless communication unit 41 wirelessly communicates with each of the communication terminals 30-1 to 30-3.

The base station controller 42 controls the operation of each of the base stations 20-1 and 20-2.

The first terminal information collection unit 43 receives terminal information transmitted by each of the communication terminals 30-1 to 30-3, and collects the received terminal information together with an identifier. When requesting terminal information of the communication terminals 30-1 to 30-3, the first terminal information collection unit 43 may request terminal information of all the communication terminals 30-1 to 30-3, or request terminal information of only communication terminals not in an idle state but in a connected state. The first terminal information collection unit 43 outputs the collected terminal information to the second terminal information collection unit 44.

The second terminal information collection unit 44 collects the terminal information output from the first terminal information collection unit 43 and that transmitted by each of the base stations 20-1 and 20-2 via the local network. The second terminal information collection unit 44 transmits the collected terminal information to the map generator 46.

The terminal information accumulation unit 45 accumulates a radio wave environment map generated by the map generator 46. Note that the radio wave environment map will be described in conjunction with the map generator 46.

In response to a request from the map generator 46, the terminal information accumulation unit 45 searches accumulated past radio wave environment maps for a radio wave environment map with the distribution of representative terminals similar to that of the radio wave environment map generated by the map generator 46. The terminal information accumulation unit 45 transmits the radio wave environment map obtained by the search processing to the map generator 46. Note that the representative terminals will be described in conjunction with the map generator 46, similarly to the above radio wave environment map.

Furthermore, the terminal information accumulation unit 45 sets priority levels for the accumulated radio wave environment maps so that a radio wave environment map having a higher use frequency has a higher priority level. For example, the terminal information accumulation unit 45 accumulates, for each radio wave environment map, as an index for recognizing a use frequency, the number of times the radio wave environment map is transmitted to the map generator 46, and then sets a higher priority level for a radio wave environment map transmitted a larger number of times.

The map generator 46 extracts a representative terminal by grouping together communication terminals which have been determined to be close to each other. The map generator 46 generates a radio wave environment map indicating the distribution of the extracted representative terminals in an indoor area. The map generator 46 transmits the generated radio wave environment map to the terminal information accumulation unit 45.

If an area where no representative terminal is extracted since no communication terminal and thus it is impossible to acquire any terminal information, the map generator 46 complements a representative terminal in the area where no representative terminal is extracted. At this time, the map generator 46 sends a radio wave environment map search request to the terminal information accumulation unit 45. The map generator 46 acquires one of the radio wave environment maps accumulated in the terminal information accumulation unit 45, which has a distribution of representative terminals similar to that of the generated radio wave environment map. The map generator 46 complements, by the acquired radio wave environment map, a representative terminal in an area where no representative terminal is extracted, and generates a complementary radio wave environment map including the complemented representative terminal. The map generator 46 transmits the generated complementary radio wave environment map to the parameter calculator 47.

Note that the map generator 46 may specify the position of each communication terminal based on sensor information such as GPS information transmitted by the communication terminal via the base station. At this time, the map generator 46 determines based on the pieces of position information whether the communication terminals are close to each other, and extracts a representative terminal by grouping together communication terminals which have been determined to be close to each other.

Based on the complementary radio wave environment map generated by the map generator 46, the parameter calculator 47 determines a transmission power, operating frequency, physical cell ID, neighbor list, handover threshold, base station ID, frequency bandwidth, the IP address of a base station, neighboring cell information, cell size, and the like. Note that the neighbor list, neighboring cell information, and handover threshold can form a radio wave environment in combination with the transmission power and operating frequency. That is, it is possible to control handover and generate a radio wave environment on the assumption that frequency resources are reallocated to the communication terminals in operation by intentionally changing the neighbor list and neighboring cell information in operation. Furthermore, by using the changed handover threshold, it is possible to improve the throughput by changing the connection destination of a terminal.

As a practical example, a method of determining transmission powers and operating frequencies for the base stations will be described.

The parameter calculator 47 receives the complementary radio wave environment map transmitted by the map generator 46, and calculates an SINR for each representative terminal of the received complementary radio wave environment map based on terminal information included in the representative terminal. Furthermore, based on the calculated SINRs for the respective representative terminals, the parameter calculator 47 obtains the variance of the SINRs, a lowest SINR value, an average SINR value, and a highest SINR value.

The parameter calculator 47 sets operating frequencies and transmission powers for the base stations by simulation, and empirically estimates the received powers of the representative terminals for the operating frequencies and transmission powers set by simulation, based on the past maps accumulated in the terminal information accumulation unit 45. The parameter calculator 47 determines new operating frequencies and transmission powers for the base stations based on the estimation result.

For example, the parameter calculator 47 sets base station parameters for the representative base station 40 and base stations 20-1 and 20-2 by simulation. The parameter calculator 47 reads out a change trend of the received power of each representative terminal along with a change in base station parameters from the terminal information accumulation unit 45. Based on the readout trend, the parameter calculator 47 calculates the received power of the representative terminal for the base station parameters set by simulation. The parameter calculator 47 calculates an SINR from the calculated received power. Based on the calculated SINRs, the parameter calculator 47 obtains the variance of the SINRs, a lowest SINR value, an average SINR value, and a highest SINR value.

The parameter calculator 47 determines new base station parameters for the representative base station 40 and base stations 20-1 and 20-2 among the base station parameters set by simulation by referring to the obtained variance of the SINRs, lowest SINR value, average SINR value, and highest SINR value. Among the calculated base station parameters, the parameter calculator 47 determines, as new base station parameters, base station parameters with which the lowest SINR value is equal to or higher than a predetermined value (for example, 4 dB), the highest SINR value is equal to or lower than a predetermined value (for example, 37 dB), the variance of the SINRs of the respective representative terminals falls within a predetermined range, and the average SINR value is highest.

The parameter calculator 47 transmits the physical cell ID of a corresponding base station and the determined base station parameters to the parameter setting unit 48.

The parameter setting unit 48 sets the determined base station parameters in each base station specified by the physical cell ID transmitted by the parameter calculator 47.

Figure 15:
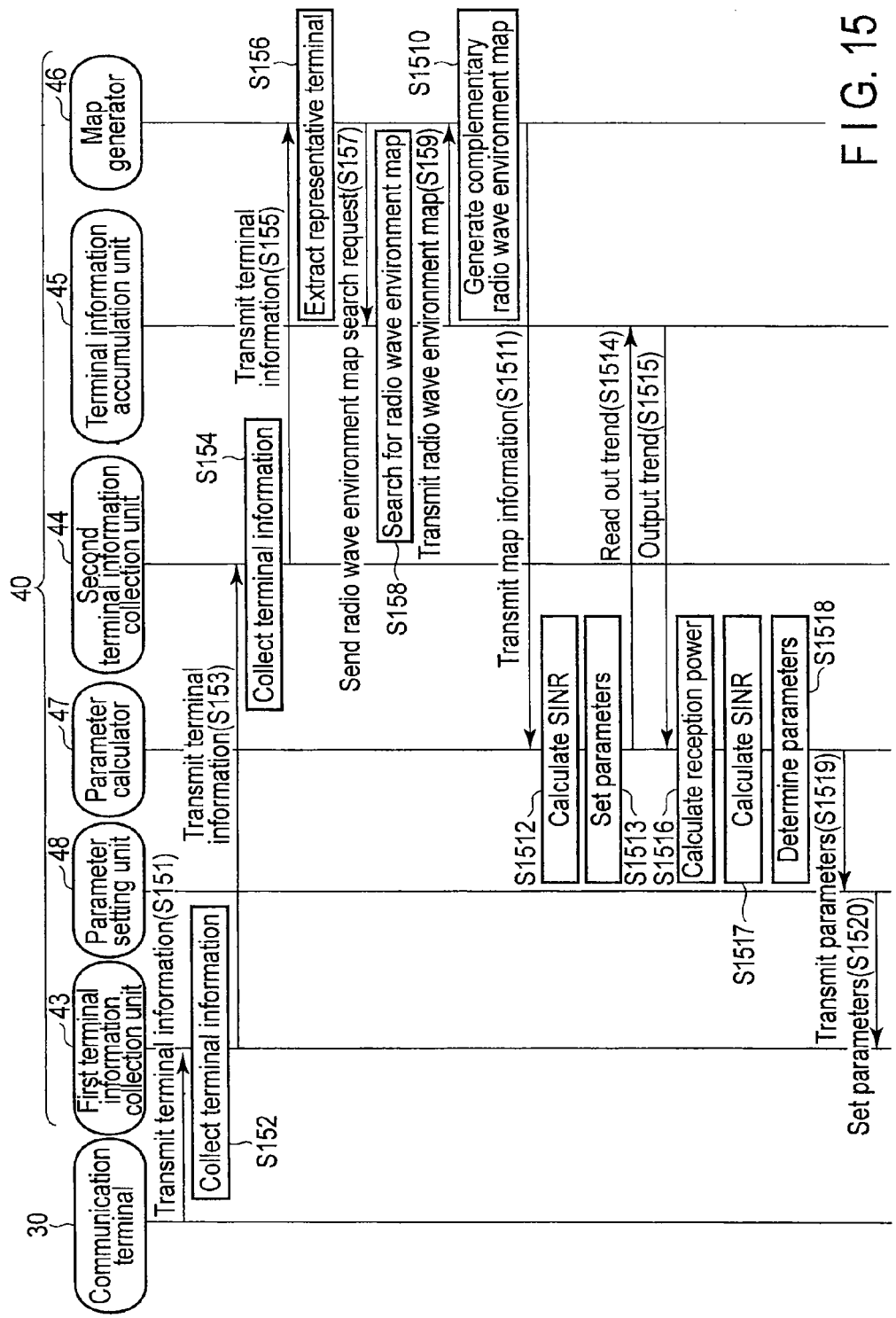
FIG. 15 is a sequence chart when the wireless communication system shown in FIG. 13 sets parameters in the representative base station and base stations.

An operation in which the wireless communication system with the above arrangement sets the parameters of the representative base station 40 and base stations 20-1 and 20-2 will be described in detail. FIG. 15 is a sequence chart when the wireless communication system according to the embodiment sets the parameters of the representative base station 40 and base stations 20-1 and 20-2.

Each of the communication terminals 30-1 to 30-3 transmits, to the representative base station 40, the held correspondence table between the received power and the physical cell ID as terminal information together with an identifier for identifying the self-terminal (sequence S151).

The first terminal information collection unit 43 of the representative base station 40 receives the terminal information transmitted by each of the communication terminals 30-1 to 30-3, and collects the received terminal information (sequence S152). The first terminal information collection unit 43 transmits the collected terminal information to the second terminal information collection unit 44 (sequence S153).

The second terminal information collection unit 44 receives the terminal information transmitted by the first terminal information collection unit 43 and that transmitted by each of the base stations 20-1 and 20-2 via the local network, and collects the received terminal information (sequence S154). The second terminal information collection unit 44 transmits the collected terminal information to the map generator 46 (sequence S155).

The map generator 46 extracts a representative terminal by grouping together communication terminals which have been determined to be close to each other (sequence S156). The map generator 46 generates a radio wave environment map indicating the distribution of the extracted representative terminals in an indoor area.

Furthermore, the map generator 46 sends a radio wave environment map search request to the terminal information accumulation unit 45 to complement a representative terminal in an area where it is impossible to extract any representative terminal (sequence S157).

In response to the request from the map generator 46, the terminal information accumulation unit 45 searches for a radio wave environment map similar to that generated in sequence S156 (sequence S158). The terminal information accumulation unit 45 transmits the radio wave environment map similar to that generated in sequence S156 to the map generator 46 (sequence S159).

The map generator 46 complements, by the radio wave environment map transmitted by the terminal information accumulation unit 45, a representative terminal in an area where it is impossible to extract any representative terminal, thereby generating a complementary radio wave environment map (sequence S1510). The map generator 46 transmits the generated complementary radio wave environment map to the parameter calculator 47 (sequence S1511).

The parameter calculator 47 receives the complementary radio wave environment map transmitted by the map generator 46, and calculates an SINR for each representative terminal of the received complementary radio wave environment map based on a received power and physical cell ID included in the representative terminal (sequence S1512). Based on the calculated SINRs of the respective representative terminals, the parameter calculator 47 obtains the variance of the SINRs, an average SINR, a lowest SINR, and a highest SINR.

The parameter calculator 47 also sets base station parameters in the representative base station 40 and base stations 20-1 and 20-2 by simulation (sequence S1513). The parameter calculator 47 reads out a change trend of the received power of each representative terminal along with a change in base station parameters from the terminal information accumulation unit 45 (sequence S1514).

In response to a trend readout operation by the parameter calculator 47, the terminal information accumulation unit 45 outputs the trend to the parameter calculator 47 (sequence S1515).

The parameter calculator 47 inputs the trend output from the terminal information accumulation unit 45. Based on the trend, the parameter calculator 47 calculates the received power of the representative terminal for the base station parameters set by simulation (sequence S1516). The parameter calculator 47 calculates an SINR from the calculated received power (sequence S1517). Based on the calculated SINRs, the parameter calculator 47 obtains the variance of the SINRs, a lowest SINR value, an average SINR value, and a highest SINR value.

Among the base station parameters set by simulation, the parameter calculator 47 determines new base station parameters for the representative base station 40 and base stations 20-1 and 20-2 by referring to the obtained variance of the SINRs, average SINR value, lowest SINR value, and highest SINR value (sequence S1518). The parameter calculator 47 transmits the new base station parameters to the parameter setting unit 48 (sequence S1519).

The parameter setting unit 48 sets the base station parameters transmitted by the parameter calculator 47 in the representative base station 40 and base stations 20-1 and 20-2 (sequence S1520).

Figure 17:
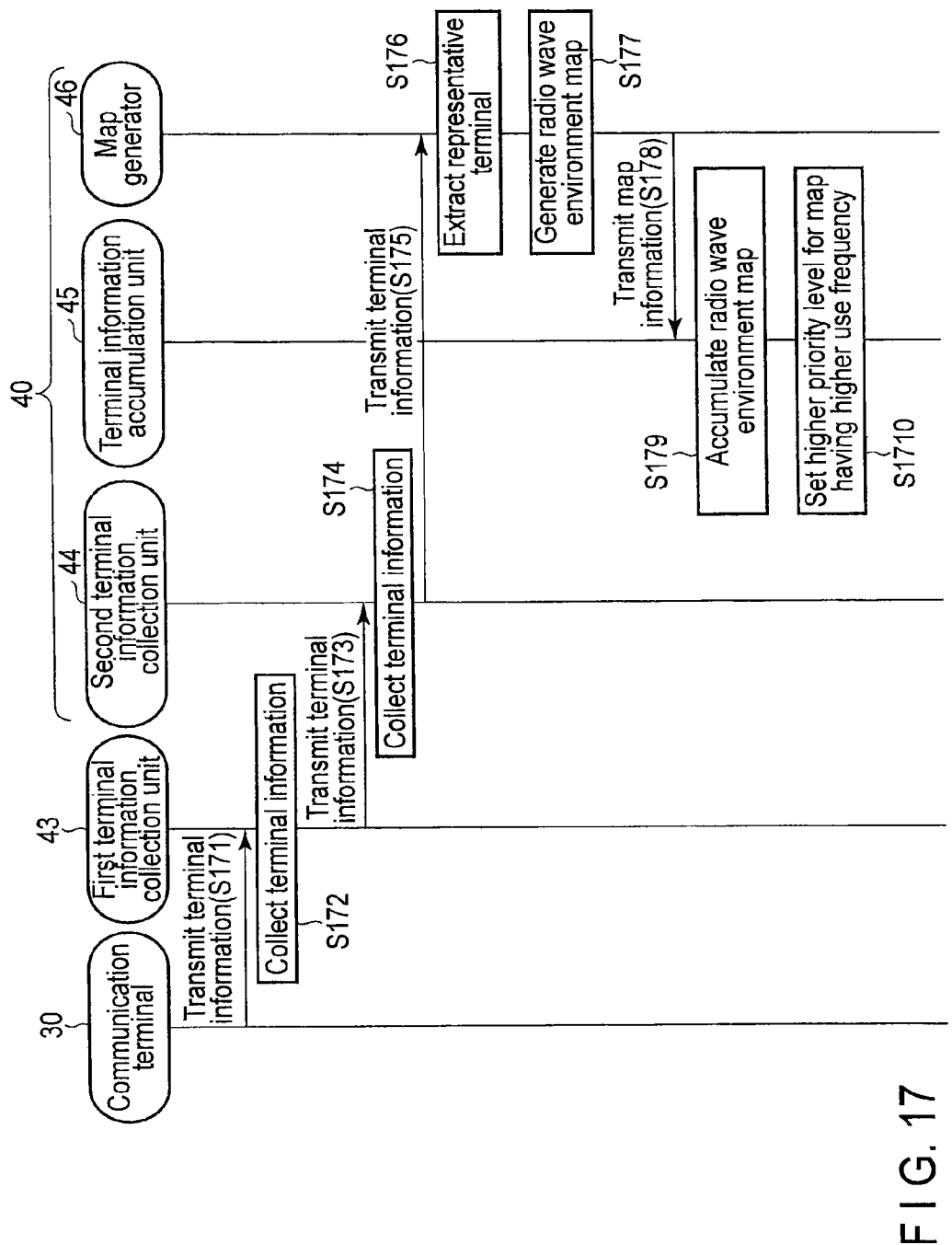
FIG. 17 is a sequence chart showing a procedure in which a terminal information accumulation unit of the representative base station shown in FIG. 14 accumulates a radio wave environment map.

An operation in which the wireless communication system according to the second embodiment accumulates a radio wave environment map will now be described in detail. FIG. 17 is a sequence chart showing a procedure in which the terminal information accumulation unit 45 accumulates a radio wave environment map.

Each of the communication terminals 30-1 to 30-3 transmits, to the representative base station 40, the held correspondence table between the received power and the physical cell ID as terminal information together with an identifier for identifying the self-terminal (sequence S171).

The first terminal information collection unit 43 of the representative base station 40 receives the terminal information transmitted by each of the communication terminals 30-1 to 30-3, and collects the received terminal information (sequence S172). The first terminal information collection unit 43 transmits the collected terminal information to the second terminal information collection unit 44 (sequence S173).

The second terminal information collection unit 44 receives the terminal information transmitted by the first terminal information collection unit 43 and that transmitted by each of the base stations 20-1 and 20-2 via the local network, and collects the received terminal information (sequence 5174). The second terminal information collection unit 44 transmits the collected terminal information to the map generator 46 (sequence S175).

The map generator 46 clusters the terminal information transmitted by the second terminal information collection unit 44, and extracts a representative terminal by grouping together communication terminals which have been determined to be close to each other (sequence S176). The map generator 46 generates a radio wave environment map indicating the distribution of the extracted representative terminals in an indoor area (sequence S177). The map generator 46 transmits the generated radio wave environment map to the terminal information accumulation unit 45 (sequence S178).

The terminal information accumulation unit 45 receives the radio wave environment map transmitted by the map generator 46, and accumulates the received radio wave environment map (sequence S179). The terminal information accumulation unit 45 also sets priority levels for the radio wave environment maps so that a radio wave environment map having a higher use frequency has a higher priority level (sequence S1710).

As described above, in the second embodiment, the representative base station 40 receives a received power and physical cell ID from each communication terminal 30 for wireless communication. Each of the base stations 20-1 and 20-2 outputs the received power and physical cell ID to the representative base station 40 via the local network. The representative base station 40 clusters the received powers and physical cell IDs, and extracts a representative terminal by grouping together communication terminals which have been determined to be close to each other, thereby generating a radio wave environment map. The representative base station 40 accumulates the generated radio wave environment map in the terminal information accumulation unit 45. The representative base station 40 sets operating frequencies and transmission powers in the base stations by simulation, and empirically estimates the received powers of the representative terminals for the operating frequencies and transmission powers set by simulation, based on the past maps accumulated in the terminal information accumulation unit 45. The representative base station 40 determines new operating frequencies and transmission powers for the representative base station 40 and base stations 20-1 and 20-2 based on the estimation result. The representative base station 40 sets the new operating frequencies and transmission powers. This allows the wireless communication system to dynamically improve the throughput even if a change in operation environment decreases the throughput.

According to the wireless communication system of the second embodiment, therefore, it is possible to update a radio wave environment map and dynamically adjust parameters to optimal values according to a change in operation environment.

The terminal information accumulation unit 45 sets priority levels for the accumulated past radio wave environment maps so that a radio wave environment map having a higher use frequency has a higher priority level. The terminal information accumulation unit 45 preferentially searches for a map set with a higher priority level. This enables the terminal information accumulation unit 45 to shorten the time taken to search for a radio wave environment map.

Although the map generator 46 uses a past radio wave environment map similar to the generated one to complement a representative terminal in an area where no representative terminal is extracted, the present invention is not limited to this. The map generator 46 may estimate a position where a representative terminal appears by clustering, based on a past radio wave environment map similar to the generated one. This allows the map generator 46 to shorten the time taken for clustering.

Furthermore, in the second embodiment, a case in which the parameter calculator 47 determines new base station parameters for the representative base station 40 and base stations 20-1 and 20-2 by referring to the variance of SINRs, a lowest SINR value, an average SINR value, and a highest SINR value without considering the number of communication terminals in the group has been exemplified. If, however, the number of communication terminals which are grouped into a representative terminal is equal to or larger than a specified number, an SINR calculated by the parameter calculator 47 becomes small, which increases the variance of SINRs.

To solve this problem, if the number of communication terminals which are grouped into a representative terminal is equal to or larger than the specified number, the parameter calculator 47 may widen the tolerance range of the variance of SINRs by a preset range in consideration of the number of communication terminals in the group. This enables the parameter calculator 47 to include, as candidates, base station parameters excluded from candidates in the second embodiment. That is, the parameter calculator 47 can determine base station parameters more correctly because it also considers base station parameters with a large variance of SINRs.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A representative base station comprising:
a first terminal information collection unit configured to acquire and collect a received power of a signal transmitted by each of a plurality of base stations and a physical cell ID of the base station transmits the signal, which are held by a communication terminal for wirelessly communicating with the self station;
a second terminal information collection unit configured to acquire the received power and the physical cell ID which are collected by the first terminal information collection unit, and the received power and the physical cell ID which are collected by each of the plurality of base stations, and collect the acquired received powers and physical cell IDs;
a map generator configured to determine based on the collected received powers and physical cell IDs whether the communication terminals are close to each other, extract, when it is determined that communication terminals are close to each other, a representative terminal by grouping together the communication terminals which are close to each other, and generate a map indicating a distribution of the representative terminals;
a terminal information accumulation unit configured to accumulate the map generated by the map generator;
a parameter calculator configured to set operating frequencies and transmission powers for the base stations, empirically estimate, based on past maps accumulated in the terminal information accumulation unit, received powers of the representative terminals generated by the operating frequencies and transmission powers sets by simulation, and determine new operating frequencies and transmission powers for the base stations based on the estimation result; and
a parameter setting unit configured to set the new operating frequencies and transmission powers in the base stations.

2. The representative base station according to claim 1, wherein
the terminal information accumulation unit searches for a map similar to the map generated based on the accumulated past maps, and transmits the map acquired by the search processing to the map generator, and
the map generator complements a representative terminal in an area where it is impossible to extract the representative terminal by a representative terminal included in the map transmitted by the terminal information accumulation unit.

3. The representative base station according to claim 2, wherein the terminal information accumulation unit sets priority levels for the accumulated past maps so that a map having a higher use frequency has a higher priority level and a map having the higher priority level is preferentially selected in the search processing.

4. The representative base station according to claim 1, wherein
the first terminal information collection unit collects sensor information for specifying a position of each of the plurality of communication terminals from the communication terminals, and
the map generator determines based on the sensor information whether the plurality of communication terminals are close to each other, and extracts, when it is determined that communication terminals are close to each other, a representative terminal by grouping together the communication terminals which are close to each other.

5. The representative base station according to claim 1, wherein the parameter calculator sets the operating frequencies and transmission powers by simulation,
reads out a change trend of a received power of each of the representative terminals along with a change in operating frequencies and transmission powers from the accumulated past maps,
calculates the received power of the representative terminal generated by the set operating frequencies and transmission powers based on the readout trend,
calculates a Signal to Interference and Noise power Ratio(SINR) from the calculated received power, and
determines new operating frequencies and transmission powers for the base stations by referring to indices obtained by the calculated SINRs.

6. The representative base station according to claim 5, wherein
the indices include a variance of the SINRs, a lowest SINR value, a highest SINR value, and an average SINR value which are obtained from the calculated SINRs, and among the operating frequencies and transmission powers set by simulation,
the parameter calculator determines, as new operating frequencies and transmission powers, operating frequencies and transmission powers with which the lowest SINR value is not smaller than a predetermined value, the highest SINR value is not larger than a predetermined value, the variance of the SINRs of the representative terminals falls within a predetermined range, and the average SINR value is highest.

7. The representative base station according to claim 6, wherein if the number of communication terminals which are grouped into the representative terminal is not smaller than a specified number, the parameter calculator widens the predetermined range by a preset range.

8. A base station control method for a wireless communication system including
a plurality of base stations which are distributed and arranged in a local network and each of which wirelessly communicates with a plurality of communication terminals and acquires, from each of the plurality of communication terminals for wireless communication, a received power of a signal transmitted by each of the plurality of base stations and a physical cell ID of the base station that transmits the signal, and a control apparatus which acquires the received powers and the physical cell IDs from the plurality of base stations, and controls the plurality of base stations based on the acquired received powers and physical cell IDs, the method comprising:

collecting the received powers and physical cell IDs acquired from the plurality of base stations;

determining based on the collected received powers and physical cell IDs whether the communication terminals are close to each other, extracting, when it is determined that communication terminals are close to each other, a representative terminal by grouping together the communication terminals which are close to each other, and generating a map indicating a distribution of the representative terminals;

accumulating the generated map;

setting operating frequencies and transmission powers for the base stations by simulation, empirically estimating, based on accumulated past maps, received powers of the representative terminals generated by the operating frequencies and transmission powers sets by simulation, and determining new operating frequencies and transmission powers for the base stations based on the estimation result; and setting the new operating frequencies and transmission powers in the base stations.

* * * * *